United States Patent
Barton, III et al.

(10) Patent No.: US 11,391,866 B2
(45) Date of Patent: Jul. 19, 2022

(54) HIGH QUALITY FACTOR NON-UNIFORM METASURFACES

(71) Applicant: The Board of Trustees of the Leland Stanford Junior University, Stanford, CA (US)

(72) Inventors: David Russell Barton, III, Somerville, MA (US); Mark Lawrence, Saint Louis, MO (US); Jennifer A. Dionne, Menlo Park, CA (US); Jefferson Dixon, Staten Island, NY (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 77 days.

(21) Appl. No.: 17/089,384

(22) Filed: Nov. 4, 2020

(65) Prior Publication Data
US 2021/0132255 A1  May 6, 2021

Related U.S. Application Data

(60) Provisional application No. 62/930,226, filed on Nov. 4, 2019.

(51) Int. Cl.
| | |
|---|---|
| *G02B 6/26* | (2006.01) |
| *G02B 1/00* | (2006.01) |
| *G02B 27/10* | (2006.01) |
| *G02B 6/12* | (2006.01) |

(52) U.S. Cl.
CPC .............. *G02B 1/005* (2013.01); *G02B 1/002* (2013.01); *G02B 6/26* (2013.01); *G02B 27/1086* (2013.01); *G02B 6/12* (2013.01)

(58) Field of Classification Search
CPC . G02B 6/12; G02B 6/26; G02B 1/002; G02B 1/005; G02B 27/1086
See application file for complete search history.

(56) References Cited

U.S. PATENT DOCUMENTS

| | | | |
|---|---|---|---|
| 8,330,952 B2 * | 12/2012 | Wu | G01N 21/658 356/301 |
| 9,507,064 B2 | 11/2016 | Brongersma | |
| 9,685,765 B2 | 6/2017 | Sinclair | |
| 10,393,933 B2 | 8/2019 | Sinclair | |
| 2010/0126577 A1 * | 5/2010 | Wu | G02B 6/34 136/256 |
| 2016/0356956 A1 * | 12/2016 | Davoine | G02B 6/12007 |

(Continued)

OTHER PUBLICATIONS

Chen et al., "A broadband achromatic metalens for focusing and imaging in the visible", 2018, Nature Nanotechnology, vol. 13, pp. 220-226.

(Continued)

*Primary Examiner* — Daniel Petkovsek
(74) *Attorney, Agent, or Firm* — Lumen Patent Firm

(57) ABSTRACT

High quality factor electromagnetic metasurfaces are provided. The metasurface is configured to have in plane guided-mode resonances (e.g., corresponding to waveguide modes or the like). Coupling features are included in the metasurface that are configured to couple free-space radiation to the guided mode resonances. The resulting structures have a high-Q response to free-space radiation and can be used for various applications, such as beam splitting, beam steering, and beam focusing or defocusing.

13 Claims, 17 Drawing Sheets

(56) References Cited

U.S. PATENT DOCUMENTS

| | | | |
|---|---|---|---|
| 2018/0241131 A1* | 8/2018 | Akselrod | G03H 1/0443 |
| 2020/0241301 A1* | 7/2020 | Basset | G02B 5/1861 |
| 2021/0088819 A1* | 3/2021 | Dionne | G02B 1/115 |
| 2022/0011646 A1* | 1/2022 | Semmlinger | G02F 1/37 |

OTHER PUBLICATIONS

Campione et al., "Broken Symmetry Dielectric Resonators for High Quality Factor Fano Metasurfaces", 2016, ACS Photonics v3, 2362-2367.

Arbabi et al., "Dielectric metasurfaces for complete control of phase and polarization with subwavelength spatial resolution and high transmission", 2015, Nature Nanotechnology, vol. 10.

Sroor et al., "High-purity orbital angular momentum states from a visible metasurface laser", 2020, Nature Photonics.

Aieta et al., "Multiwavelength achromatic metasurfaces by dispersive phase compensation", 2015, Science 347 (6228), 1342-1345.

Dionne et al., "High Q Metasurfaces for Nonlinear Free-space Optics", Jul. 2019, Novel Optical Materials and Applications, OSA technical digest paper NoT3B.1.

\* cited by examiner

HIGH QUALITY FACTOR NON-UNIFORM METASURFACES

CROSS REFERENCE TO RELATED APPLICATIONS

This application claims the benefit of U.S. provisional patent application 62/930,226, filed on Nov. 4, 2019, and hereby incorporated by reference in its entirety.

GOVERNMENT SPONSORSHIP

This invention was made with Government support under contract FA9550-15-1-0006 awarded by the Air Force Office of Scientific Research, under contract DE-SC0019140 awarded by the Department of Energy, and under contract 1641109 awarded by the National Science Foundation. The Government has certain rights in the invention.

FIELD OF THE INVENTION

This invention relates to metasurfaces acting as optical elements.

BACKGROUND

Phase gradient metasurfaces have provided unprecedented flexibility in diffractive optical element design. Using either dielectric or metallic nanoantennas, metasurfaces enable precise control of the phase, amplitude and polarization of light in a very compact footprint. Though many optical transfer functions have been realized—spanning beam-steering, beam-splitting, lensing, vortex-beam generation, and holography, most metasurfaces are limited to quality factors (Q-factors) of ~10. This low Q-factor means photon residence times are very short, and hence local electromagnetic fields tend to be small; accordingly, it is very challenging to design "active" metasurfaces that can change their phase, amplitude or polarization response with an applied bias. Thus it would be an advance in the art to provide high-Q metasurfaces.

SUMMARY

This work significantly improves the quality factor of metasurfaces, enabling a suite of applications, particularly in the realm on nonlinear nanophotonics, electro-optic modulation, classical and quantum optical generation, and free-space computing.

We experimentally demonstrate a general route to generate high quality factor resonances in metasurfaces, regardless of the phase gradient (or more general phase variation) in question. High-Q resonances are created by including subtle structural changes in individual resonators to couple out-of-plane light into otherwise momentum-mismatched modes, without modifying the local nanoantenna phase response. We experimentally demonstrate control over the quality factor and resonant wavelengths in this scheme, achieving a record quality factor (Q) greater than 2500. This Q is two orders of magnitude higher than what has been achieved before. Moreover, Q-factors in the millions are within reach with modifications to the metasurface design.

We show the applicability of our approach by designing metasurfaces that act as beamsteerers to different angles, as well as beam splitting optical elements. We also use numerical simulations to show how our scheme is generalizable to a broad range of other metasurface optical transfer functions.

Our results demonstrate a facile route to highly resonant nanophotonics with far-field phase control, which lends itself to efficient nonlinear optics, reconfigurable optical elements, and nanoscale optical sensors.

We have experimentally validated our metasurface designs by fabricating several devices with standard nanolithography techniques. We have experimentally demonstrated the highly resonant nature of our structures using Fourier plane spectroscopy of the transmitted light. We are further able to precisely place the spectral resonance within the broadband phase response typical of metasurfaces merely by modifying the period of the structural perturbations. The quality factor can additionally be controlled by the perturbation depth into the metasurface elements.

Various applications are possible. This work shows that highly resonant features, once only in the purview of on-chip photonics, can be rationally designed in phase gradient metasurfaces without modifying the phase gradient in the design process. We envision more complicated phase gradient structures such as geometric phases, lensing, and holography are in reach. The rational design of resonances can additionally be used for arbitrary multiplexing, enabling nearly arbitrary nonlinear wavemixing; further, the resonant nature here is only limited by fabrication resolution and can be extended to higher dimensions with the appropriate design. Taken together, we envision high quality metasurfaces will lead to advances in fields spanning LiFi, high-sensitivity chemical and biological sensing, nonreciprocal light transmission, non-classical light generation, and even novel neuromorphic photonic networks.

Significant advantages are provided. Currently there are no high-Q metasurfaces. Photonic crystals can support high-Q modes, but these materials cannot perform more complicated transfer functions such as lensing, holography, etc. Our scheme is highly general to any optical transfer function in a compact, nanoscale footprint, and dynamically tunable and reconfigurable metasurfaces can be easily designed with this high-Q scheme in mind. It is convenient to view the perturbation as resulting from superposing a pattern of coupling features on a metasurface having in-plane guided mode resonances. Here the pattern of coupling features couples free-space radiation to one or more of the guided mode resonances of the metasurface. In the examples provided herein, the metasurface features include waveguides, and the guided mode resonances are waveguide resonances of one or more of these waveguides. Such waveguides need not have perfect translational invariance. E.g., they can be curved or straight.

DETAILED DESCRIPTION

Figure 1A:
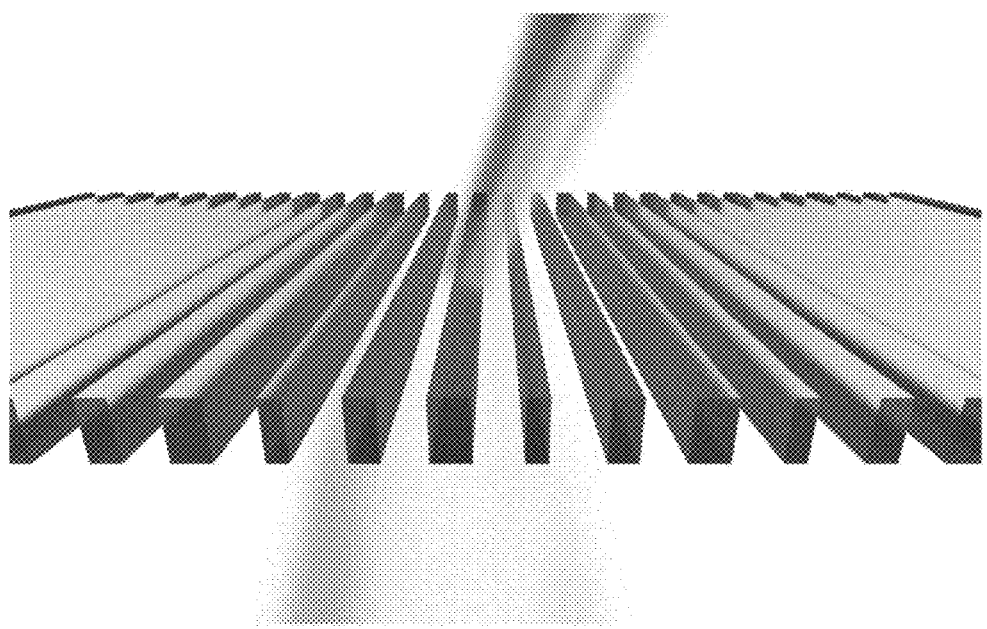
FIGS. 1A-F show conceptual and numerical design of high-Q phase gradient metasurfaces.

Section A describes general principles relating to embodiments of the invention. Section B describes several detailed experimental and simulated examples.

A) General Principles

An exemplary embodiment of the invention is apparatus including:

i) an electromagnetic metasurface having metasurface features disposed conformally on a surface of a substrate. Here adjacent metasurface features of the electromagnetic metasurface are spaced apart by less than an operating wavelength of the apparatus. The metasurface features of the electromagnetic metasurface support one or more in-plane guided mode resonances; and ii) a pattern of coupling features superposed on the metasurface features and configured to couple free-space radiation to a selected at least one of the in-plane guided mode resonances.

Here we define an electromagnetic metasurface as having a subwavelength thickness that also has sub-wavelength lateral structure at least as indicated above. The material of the metasurface features can be selected from the group consisting of: silicon, lithium niobate, gallium phosphide, gallium arsenide, aluminum nitride, indium phosphide, III-V semiconductors, and diamond. However, practice of the invention does not depend critically on the material composition of the metasurface features. Similarly, practice of the invention does not depend critically on the material composition of the substrate. The surface of the substrate can be planar or curved.

The metasurface features can include one or more waveguides, where the guided mode resonances correspond to waveguide modes of the waveguides. In this case, the coupling features can include a periodic longitudinal perturbation of the waveguides. Such waveguides can be conventional waveguides or photonic crystal waveguides The quality factor Q of the selected at least one of the in-plane guided mode resonances is preferably 100 or more, and is more preferably 1,000 or more.

The metasurface features can have at least one subwavelength dimension. E.g., the heights and widths of the silicon bars in the examples below are sub-wavelength features.

The electromagnetic metasurface can be a phase gradient metasurface. The electromagnetic metasurface can be configured as a beam steering device. The electromagnetic metasurface can be configured as a beam splitting device. The electromagnetic metasurface can be configured as a beam focusing or defocusing device (i.e., as a lens).

B) Detailed Examples

B1) Introduction

Due to their small mode volumes and extremely high quality factors (Q-factors), micro-cavities have transformed the way we manipulate light as well as the way light is used to interrogate physical systems. Whispering gallery resonators in particular, with Qs ranging from thousands to billions, corresponding to resonant lifetimes from picoseconds to microseconds, have produced unprecedented light-matter coupling strengths. For example, whispering gallery resonators including microtoroids and microdroplets have enabled parametric oscillation, stimulated Raman scattering, cascaded Raman emission, and Kerr bistability; while these optical nonlinearities were previously only measurable with ultra-high power pulsed lasers, high-Q cavities made them observable with continuous-wave sources with power levels as low as microwatts. Important devices and applications have also been realized with chip integrated high-Q photonic crystal defect cavities and ring/whispering gallery resonators, including Raman lasing and nonlinear nonreciprocity with pump thresholds down to 1 µW, electrically pumped lasing with nA threshold current, frequency comb generation and modulation, quantum entangled photon generation, single photon switching and isolation, and even virus detection at the single particle level.

As the dimensions of an optical cavity are reduced to the subwavelength scale, they take on an entirely different character. In this size regime, resonant modes start to resemble point sources, scattering an incident wave in many different directions. While the large number of scattering channels generally translates into a high radiative loss rate and thus low Q-factor, these nanoscale objects, or nanoantennas, have proven to be excellent building blocks for constructing phase gradient metasurfaces. Having nonuniform arrays of nanoscale dielectric or metallic resonators, metasurfaces sculpt the spatial distribution of scattered phase, amplitude, and polarization of an impinging light wave with subwavelength resolution. Such flat optical devices provide a versatile and highly compact route to free-space light manipulation, often meeting or exceeding the performance of their bulk optical counterparts. Unfortunately, the Qs of metasurface elements have so far been limited to a few 10 s. Consequently, nonlinear behavior has only been seen when pumping the devices with high power femtosecond pulses. Similarly, with weakly resonant scattering being rather insensitive to changes in refractive index, it has proven difficult to dynamically modulate phase gradient structures; to date, achieving metasurface modulation depths exceeding a few dB has proven challenging.

Here, we provide a new approach to combine the power of high Q resonances seen previously in microcavities with the full wavefront control enabled by subwavelength diffractive flat optics. By judiciously arranging isolated silicon nanoantennas supporting specific Mie and guided mode resonant distributions we measure Q factors as high as 2500 in beam-steering and beam-splitting phase gradient metasurfaces. We also numerically extend the concept of high Q beam-steering to other spectral transfer functions, including narrow-band and slow-light beam-steering. In all cases, with silicon having an extinction coefficient less than 1e-9 for wavelengths greater than 1.3 um, the quality factor is limited only by long-range uniformity and lithographic resolution.

B2) Design of Guided Mode Resonant Beamsteering Metasurface

Throughout this section, all structures are based on arrays of 600 nm tall silicon bars atop a sapphire substrate. We will show that this simple platform can be engineered to exhibit unique light trapping and scattering properties by combining two distinct design strategies. The first strategy relies upon the fact that each bar supports a pair of spectrally overlapping electric and magnetic dipole Mie resonances when illuminated with TM-polarized light. This overlap ensures that transmission remains high while the phase delay through a given bar can be varied by adjusting its width. When combined into a single array, known as a Huygens metasurface, bars of different widths then act as phase 'pixels', collectively generating a desired wavefront for transmitted light.

FIG. 1A schematically illustrates the optical scattering from a periodic metasurface having a unit cell of three equally spaced nanobars with widths of 190 nm, 260 nm and 350 nm, repeated every 2121 nm. This choice of widths corresponds to a constant relative phase delay between neighboring elements equal to $2\pi/3$, approximating a linear phase gradient. Such a device is known to steer a normally incident beam to the angle $\theta_t$, according to the generalized Snell's law $\theta_t=\arcsin(\lambda/n_t p)$, where p is the metasurface period, $\lambda$ is the free-space wavelength and $n_t$ is the transmission refractive index. In our case, p=2121 nm, $\theta_t$ ranges from 40°-45° for $\lambda$=1380-1500 nm.

Figure 1C:
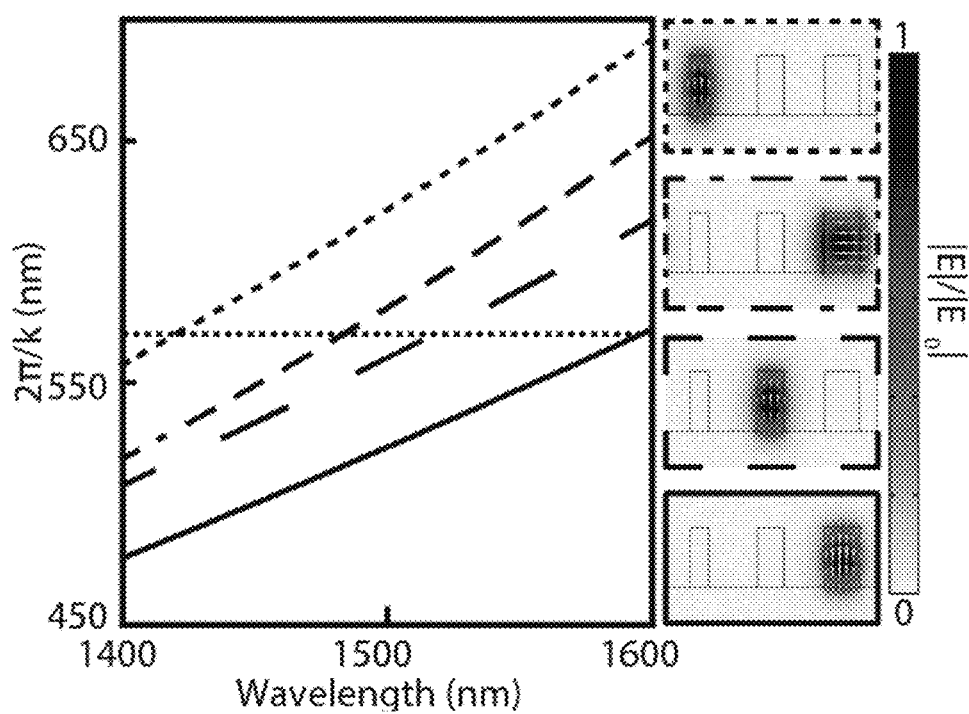
Figure 1B:
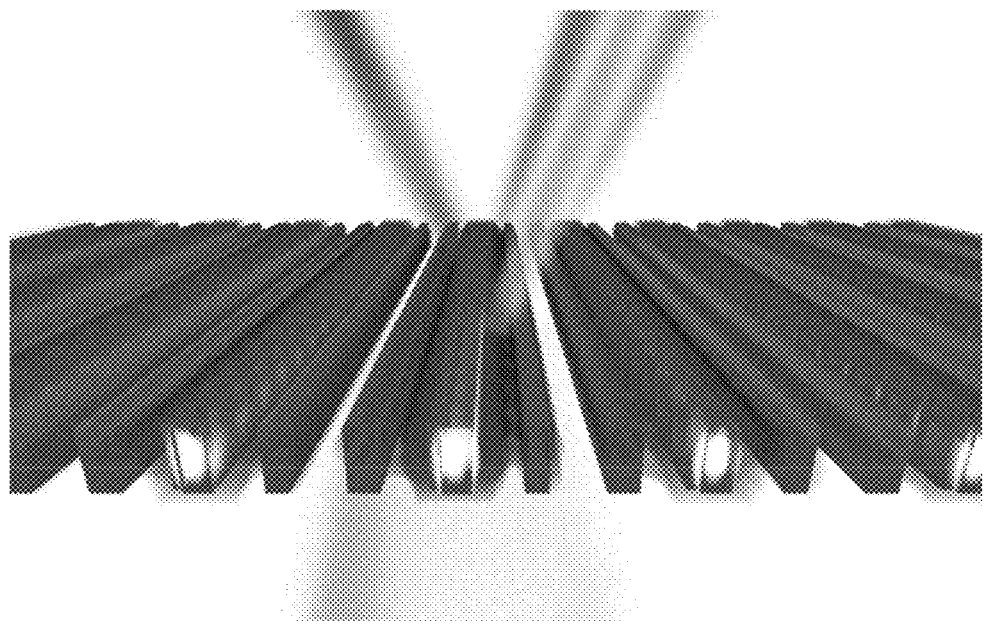

Our second and most important design concept, illustrated schematically in FIG. 1B, involves subtly perturbing individual nanoantennas to generate high Q dipole resonances. To this end, we note that each nanoantenna maintains a degree of translational symmetry (FIG. 1A). Therefore, as well as modifying free-space optical signals, each metasurface element can also act as a waveguide. This can be seen from FIG. 1C which shows the calculated waveguide dispersion for the first 4 modes within the metasurface. The lowest and third-lowest order modes, represented by solid and medium-dashed curves, respectively, correspond to guided solutions of the widest bar (see near-fields in FIG. 1C). All these modes possess larger momentum than free-space radiation, and so are fully bound to their respective nanoantennas. This momentum mismatch can be bridged by introducing a series of periodic notches, with period A. If a sufficient number of notches are used, light will leak back out to free-space appearing as a guided mode resonance (GMR) in the diffraction spectra when A equals the guided mode wavelength.

This contrasts with grating couplers where energy instead leaves through the end of the waveguide. A numerical example of such a resonance for 100 nm deep, 100 nm long notches placed within the largest bar every 570 nm is given in FIG. 1D. Plots of the 0th and −1st orders are reproduced in FIGS. 5A-C below to better visualize the GMR lineshape in these orders. As expected from the phase gradient design, efficient beamsteering occurs across most of the plotted spectral range, indicated by the dominance of the +1st diffraction order (dashed curve). Close to $\lambda$=1440 nm a GMR can be seen to interrupt the broadband response, reducing the transmission and creating a narrow reflective band. The high Q-factor, approximately 8,200, of this resonance indicates that the notch dimensions used represent a weak perturbation to the continuous nanoantenna. In the near-field, the long resonant lifetime translates to a field enhancement factor exceeding 100 within the perturbed element, while the unperturbed elements show little enhancement (FIG. 1E).

Figure 1D:
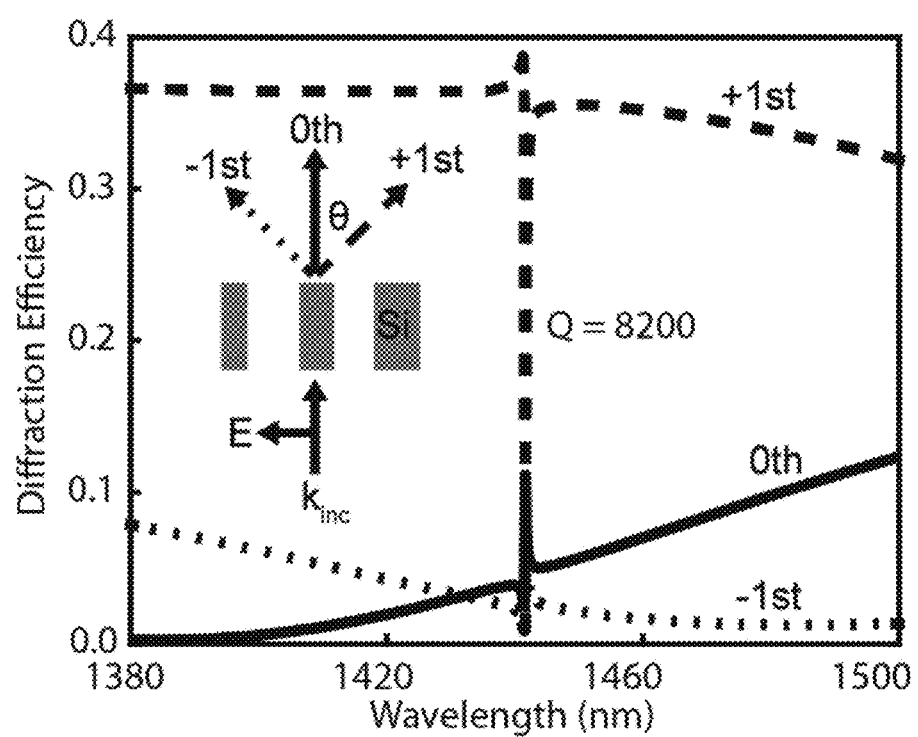
Figure 1E:
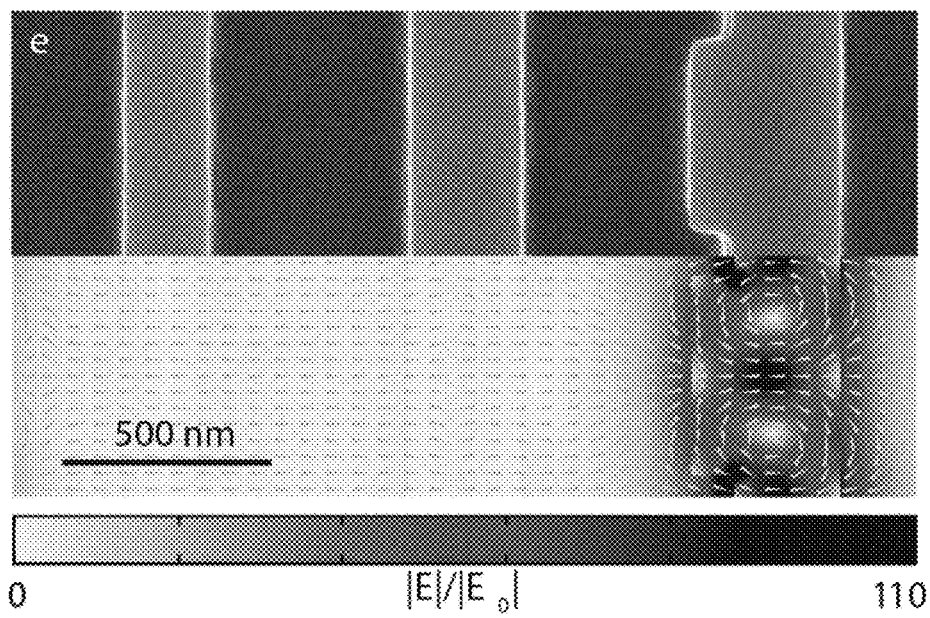
Figure 1F:
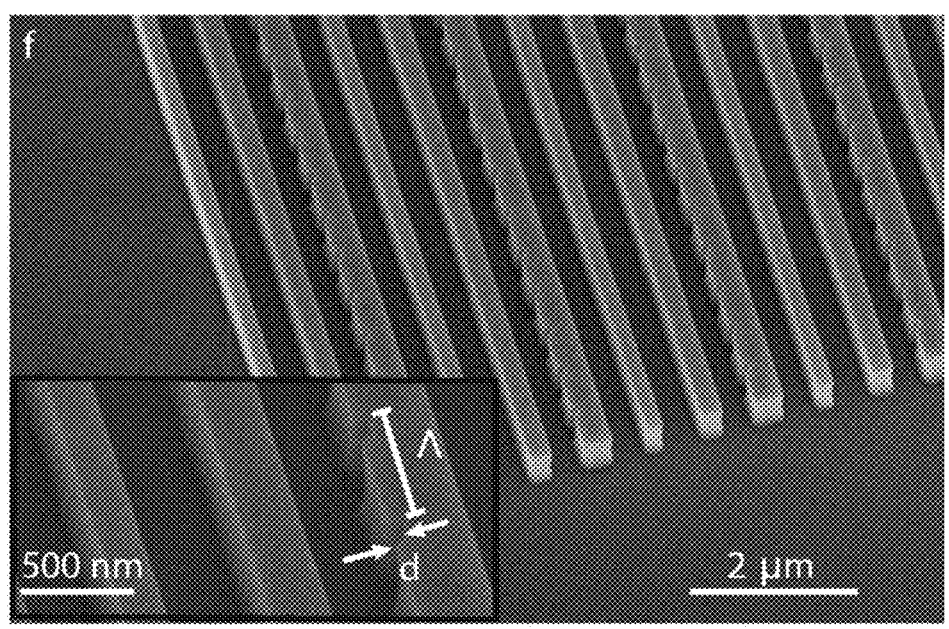

The top part of FIG. 5E is an SEM image of metasurface fabricated with nominal dimensions matching those used in the simulations of FIG. 1D. The bottom part of FIG. 1E shows a corresponding simulated electric near-field distribution at the GMR center wavelength. Arrows represent the electric field polarization. FIG. 1F shows angled SEM images, with a zoomed-in inset, of fabricated phase gradient metasurfaces, demonstrating uniform patterning and minimal sidewall tapering. Perturbation period A and depth d are labelled.

Unlike most microcavities where the injection efficiency for each mode depends on the specific mode shape, GMRs combine feedback and coupling to the external environment into a single mechanism. This means that in the absence of parasitic dissipation effects, the conditions for critical coupling are satisfied almost automatically. Importantly for our high-Q metasurface design, the absorption losses of silicon in the near infrared are negligible, and so the resonant lifetime is dominated by radiative loss; indeed, for small notch depths the radiative loss is entirely dependent on the notch structure. For example, after reproducing FIG. 1D with the perturbation depth reduced to 50 nm, the Q increases to 39,000. We note that GMRs have previously been investigated in 2-dimensionally periodic nanostructures. In these studies, lattice interference across a 1D or 2D grating suppresses free-space scattering, giving rise to very sharp spectral features under free-space illumination. Considerable work has been directed towards locating and implanting these resonances in momentum space, and understanding the physics governing their formation and collapse. Instead, crucially, by not relying simply on modes that are delocalized throughout a 2D plane, here our silicon nanobars maintain a dipole radiation pattern in the plane of diffraction giving much finer control over scattered wavefronts.

Figure 1G:
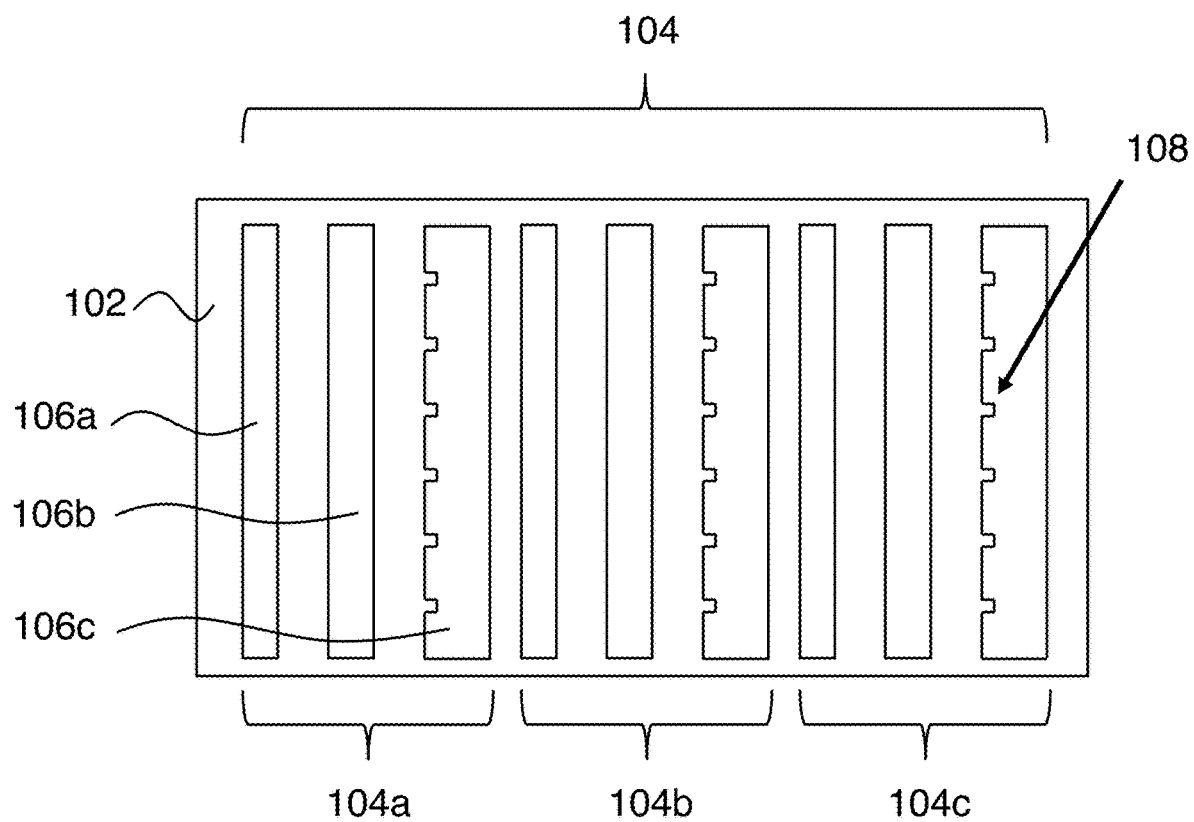
FIGS. 1G-K show several examples of design options.
Figure 1H:
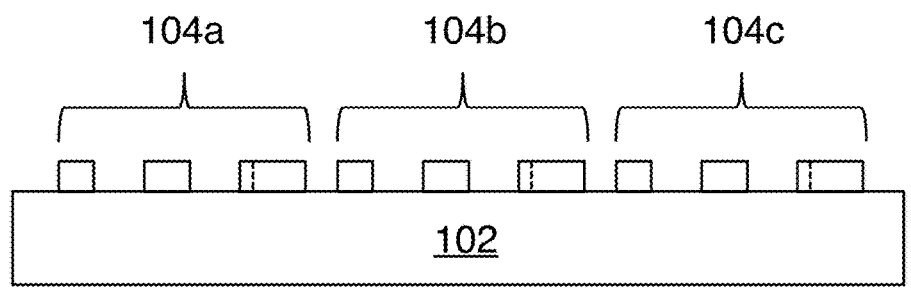

FIG. 1G is a line drawing top view (not to scale) corresponding to the image of FIG. 1F, and FIG. 1H is a corresponding side view. In this example, 102 is the sapphire substrate and 104 is the metasurface features of the electromagnetic metasurface. As described above, the metasurface of this example has unit cells of three bars (106a, 106b, 106c). Three of these unit cells (104a, 104b, 104c) are shown on FIG. 1G. The spacing between these bars is sub-wavelength. The metasurface features of the electromagnetic metasurface support one or more in-plane guided mode resonances as described above. A pattern of coupling features 108 is superposed on the metasurface features and is configured to couple free-space radiation to one or more of the in-plane guided mode resonances. As indicated above, coupling features 108 of this example are periodic longitudinally spaced notches in the widest bar of the unit cells.

Figure 1I:
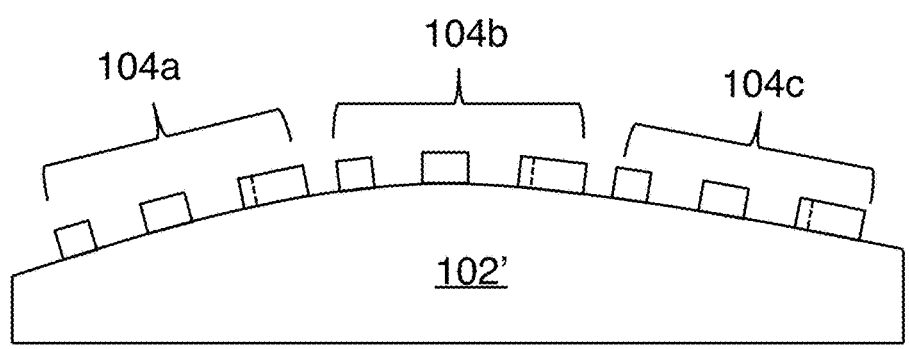

FIG. 1H shows the metasurface being disposed on a planar top surface of substrate 102. However, the surface of the substrate need not be planar. E.g., the side view of FIG. 1I shows a substrate 102' having a curved surface on which the metasurface features are conformally disposed.

Figure 1J:
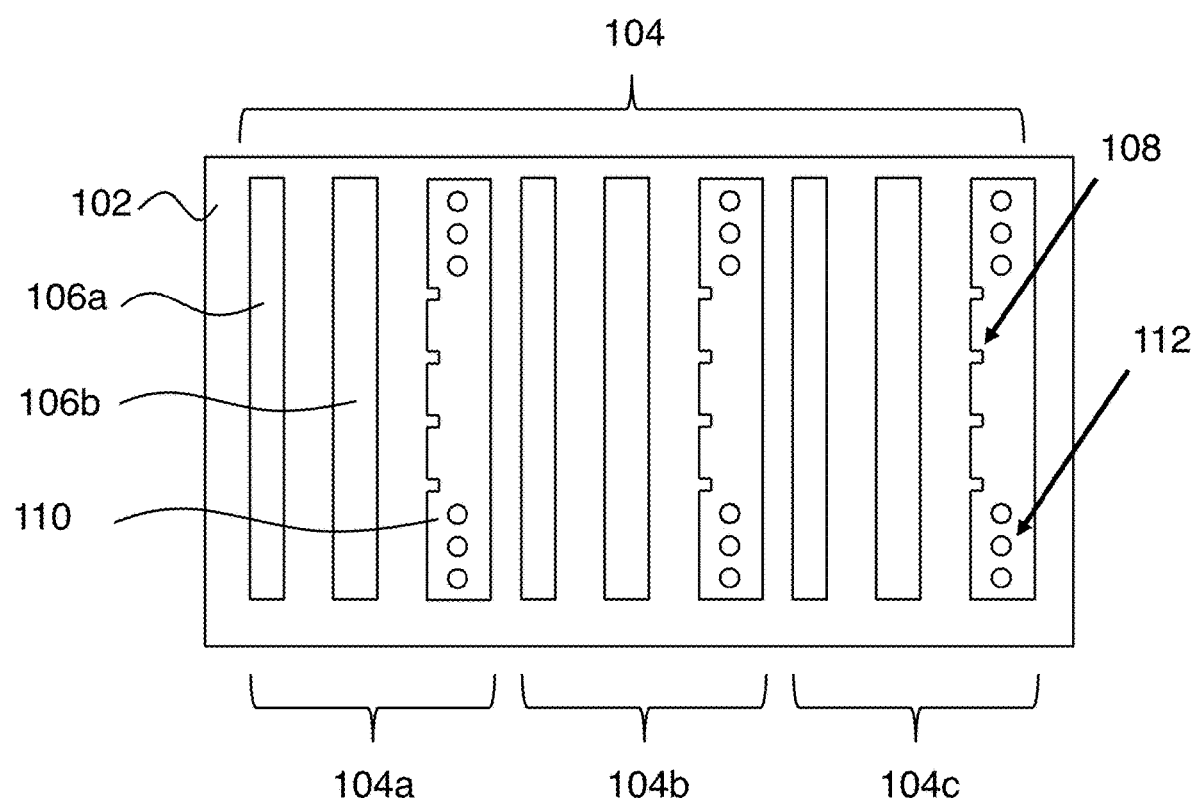
Figure 1K:
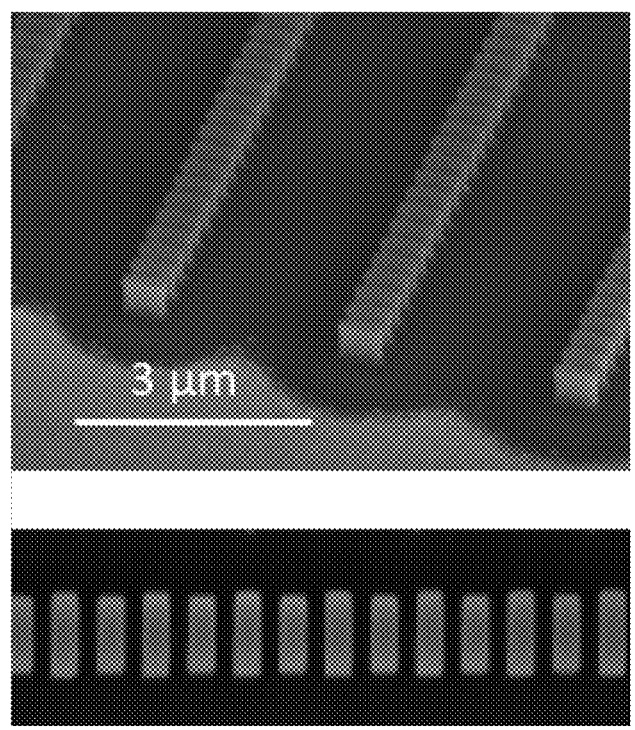

Another possible variation is the use of photonic crystal technology. FIG. 1J shows a first example of this, where photonic crystal end mirrors 112 are added to the widest bars 110 of a metasurface structure otherwise similar to that of FIG. 1G. Such end mirrors can advantageously increase the quality factor of the guided mode resonances. FIG. 1K shows a second example, where the waveguides themselves are photonic crystal waveguides. Here the perturbation is an alternating change in the widths of the segments of the photonic crystal waveguide. This can provide increased control of waveguide mode dispersion, thereby advantageously increasing the flexibility of GMR design.

B3) Measurement of High Q Beamsteering

Figure 2A:
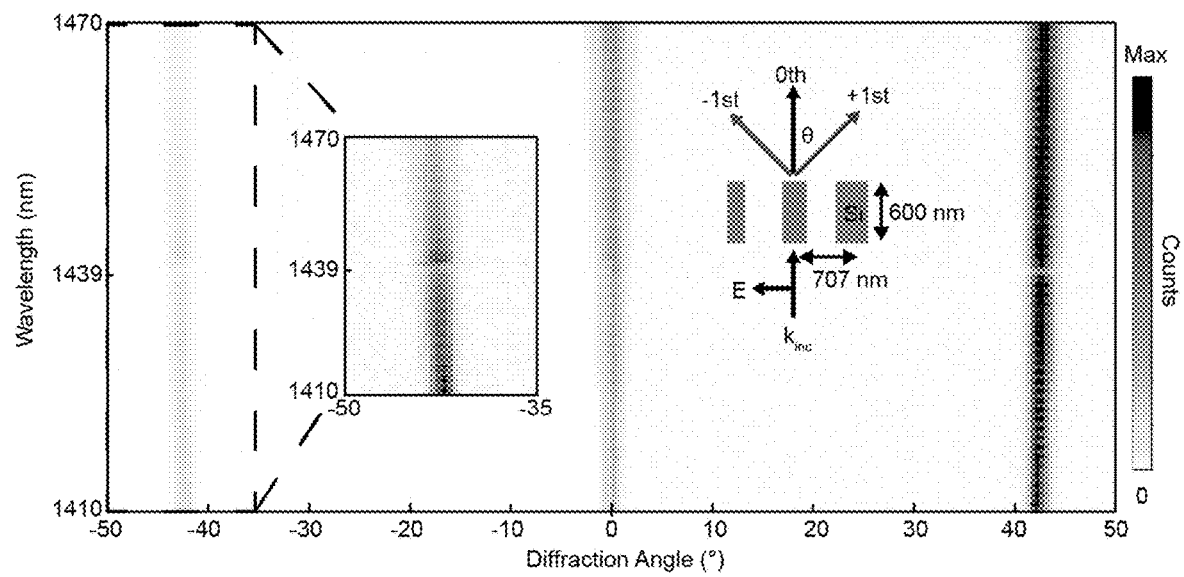
FIGS. 2A-F show an experimental demonstration of high-Q phase gradient metasurface beam steering.
Figure 6A:
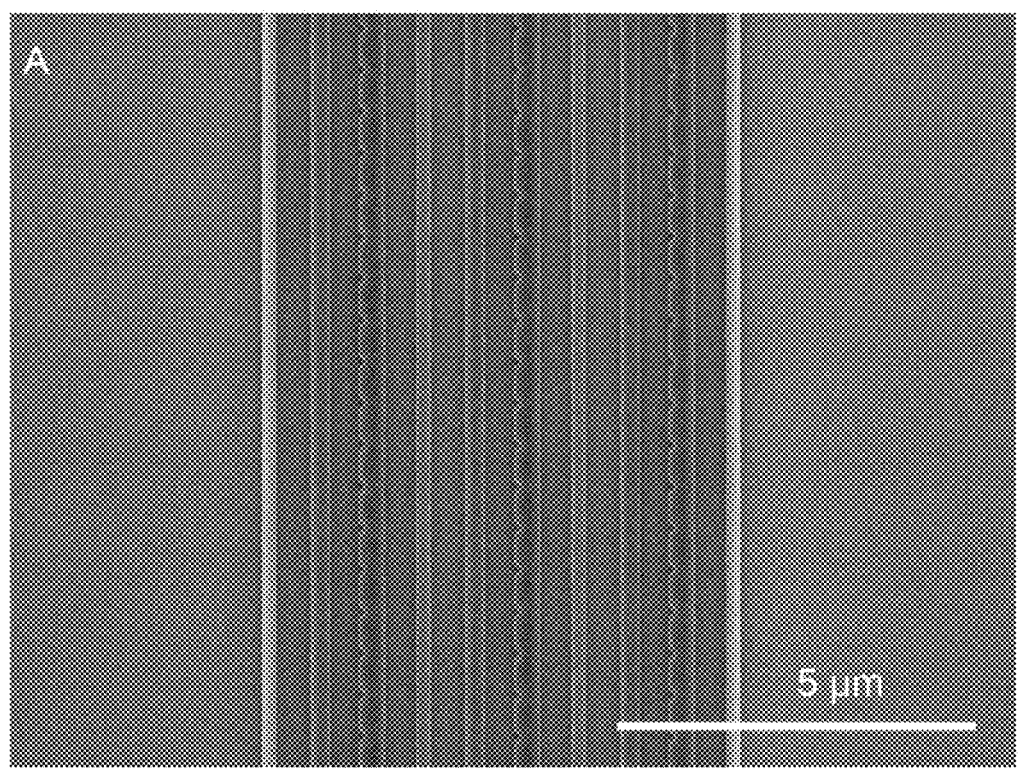
FIGS. 6A-B relate to a 10-bar device.
Figure 6B:
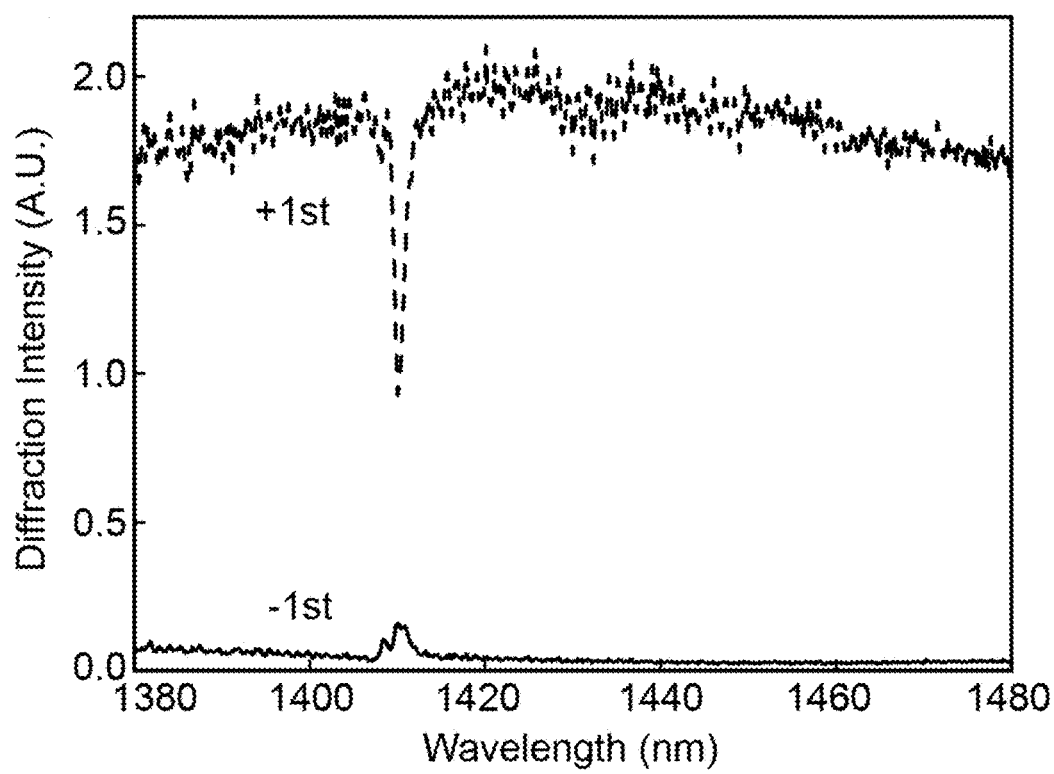

Based on the results in FIG. 1D we fabricated a series of phase-gradient metasurface samples. A representative SEM image of one such sample is shown in FIG. 1F annotated with the two parameters we have varied experimentally, the notch depth d and period Λ. We then characterize these devices by illuminating them at normal incidence through the substrate with a collimated white light laser and measuring the transmission with an imaging spectrometer. The Fourier plane spectral map of a metasurface with λ=570 nm and d=100 nm shows strong preferential scattering into the +1st diffraction order, with minimal diffraction into other directions, verifying the linear phase gradient design (FIG. 2A). A narrow dip in the +1st diffraction near 1440 nm reveals the presence of a GMR. The GMR can also be seen to modulate the other two orders, most clearly visible in the inset of FIG. 2A showing a close-up of the $-1^{st}$ diffraction, albeit with a smaller amplitude and distinct lineshape. This direction-dependent lineshape arises from interference between the weakly-coupled waveguide mode and directly transmitted Mie mode, which we will later show allows for diverse functionality. To ensure efficient free-space coupling and reduce finite-size effects, we fabricated large area (300 μm by 300 μm) metasurfaces. We note, however, that the effect does not rely on large areas (FIGS. 6A-B), and have fabricated metasurfaces only 7 μm in the phase gradient direction (corresponding to a total of 10 metasurface elements) without influencing the high-Q resonant feature (FIGS. 6A-B).

Figure 2B:
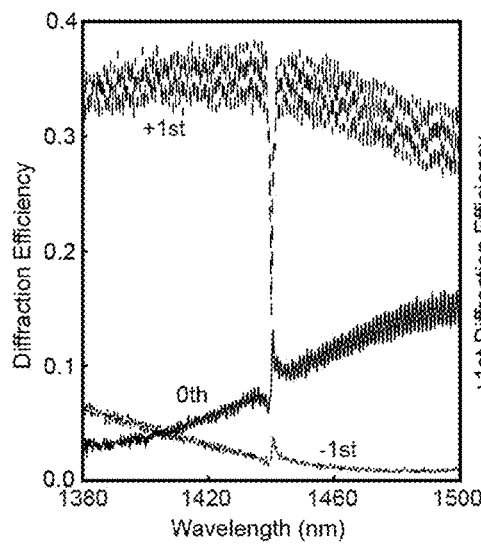
Figure 2C:
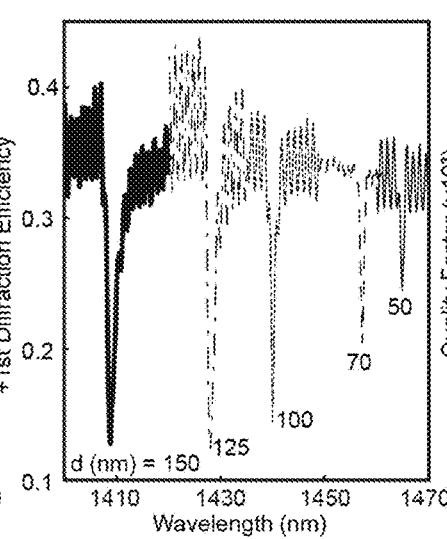
Figure 2D:
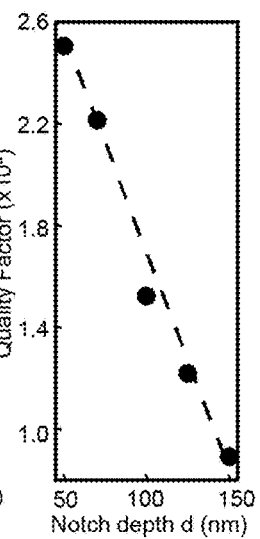
Figure 7:
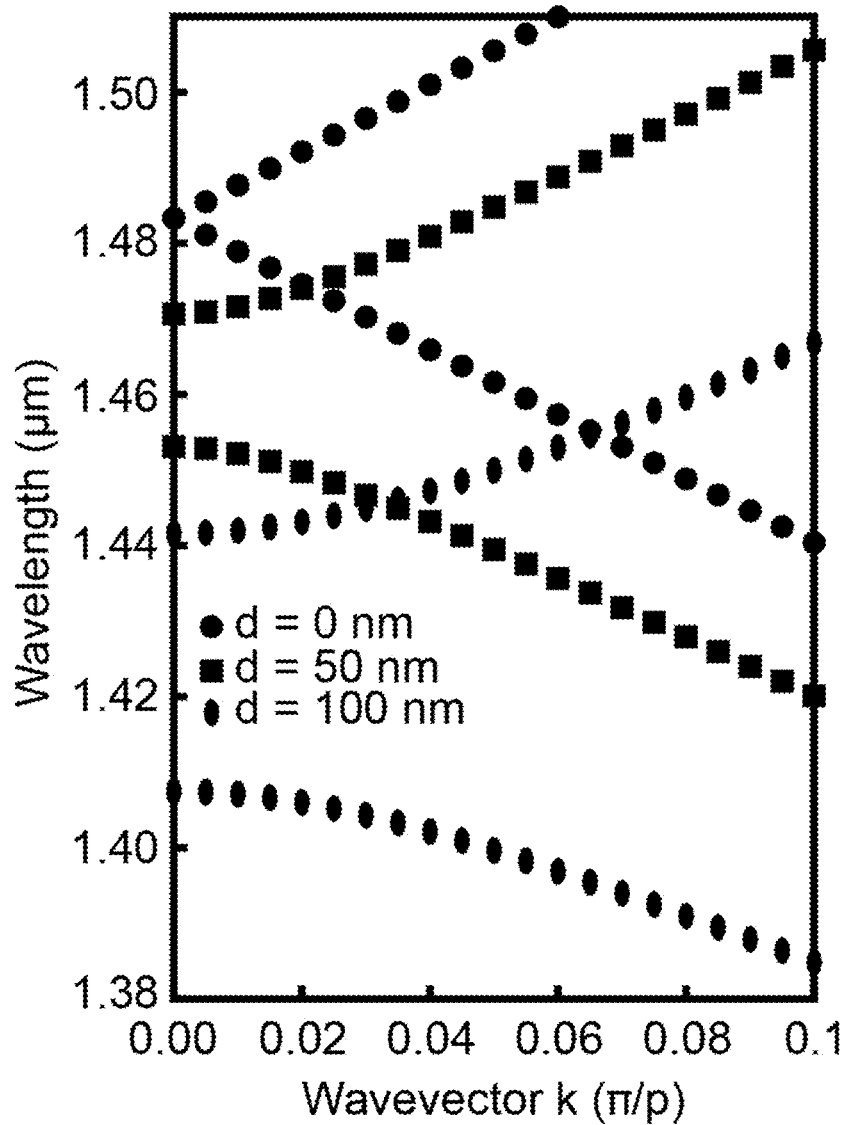
FIG. 7 shows simulated guided mode dispersion for several perturbation depths.

To better quantify the response of our metasurfaces we also recorded the real-space spectral image of each diffraction order independently. Using this approach, FIG. 2B shows the normalized spectra from the sample used in FIG. 2A. Apart from the constant oscillations coming from Fabry-Perot resonance in the substrate, we find excellent agreement between FIG. 2B and the numerical data presented in FIG. 1D. A quality factor of 1500 has been extracted for this mode. In FIG. 2C we fix λ=570 nm and plot relevant portions of the +1st diffraction spectra with the notch depth d swept from 150 nm (leftmost curve) to 50 nm (rightmost curve). As d drops to 50 nm we observe a redshift of approximately 60 nm as the GMR approaches the band crossing point of an ideal, or unnotched, waveguide (1500 nm) (FIG. 1C). This redshift makes sense, as a smaller perturbation will produce less pronounced Bragg scattering and subsequently less band splitting in the guided mode dispersion (FIG. 7). More importantly, from the narrowing linewidths of the resonant dips in FIG. 2C as well as the retrieved values plotted in FIG. 2D, Q is seen to increase from 900 to 2500. This increase clearly demonstrates the strong connection between notch depth and GMR radiative coupling strength. Unfortunately, the mode contrast also decreases with decreasing perturbation depth, likely caused by scattering loss. Nevertheless, while lower than numerically predicted due to fabrication imperfections and finite size effects, our measured values are still two orders of magnitude higher than reported phase gradient metasurface Qs to date.

Figure 2E:
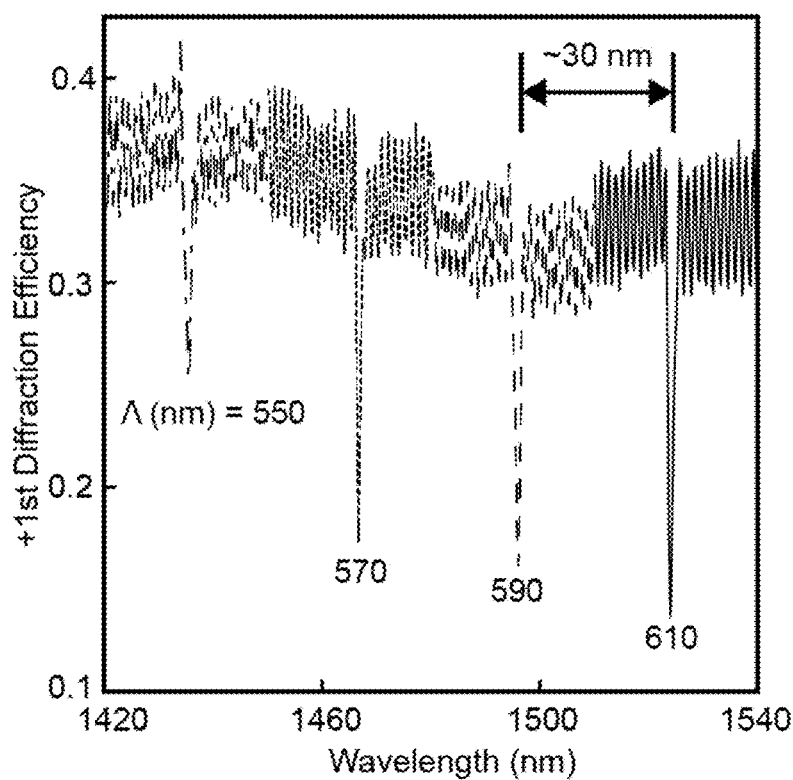

Aside from the linewidth, we also investigate the ability to systematically tune the spectral position of the GMR. Fixing d=70 nm, FIG. 2E displays the relevant portions of the +1st order diffraction efficiency for λ=550 nm (leftmost curve) to 610 nm (rightmost curve), in 20 nm increments. Here, we see that we can shift the resonant center wavelength by approximately 30 nm for every 20 nm increase in period without substantially impacting the background phase gradient profile.

Figure 2F:
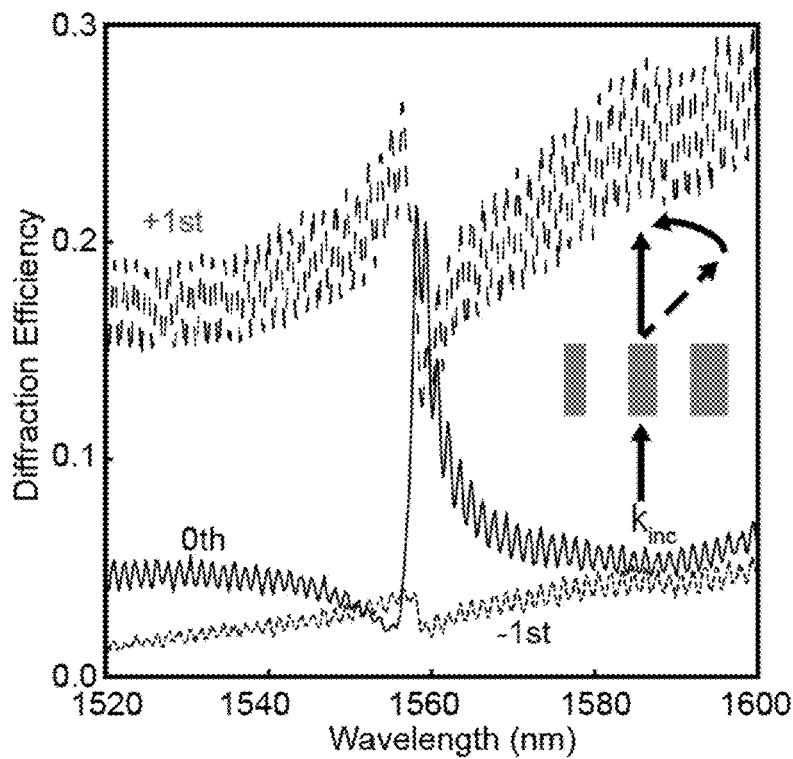

Since the perturbations are inserted into the largest bar, a second GMR exists at a longer wavelength, corresponding to free-space coupling into a vertically polarized waveguide mode (see the solid dispersion curve of FIG. 1C). FIG. 2F shows the corresponding spectra for each diffraction order. As seen, the phase relationship between the broad background and localized mode is different, leading to a more asymmetric Fano lineshape in the +1st diffraction order. There is little modification to the light scattered into the −1st diffraction order, though there is a marked increase in the 0th order. In other words, on resonance, the narrowband response is dominated by direct transmission, while off-resonance, the structure steers light to −45°.

B4) Narrow-Band and Slow-Light Beamsteering

Figure 8:
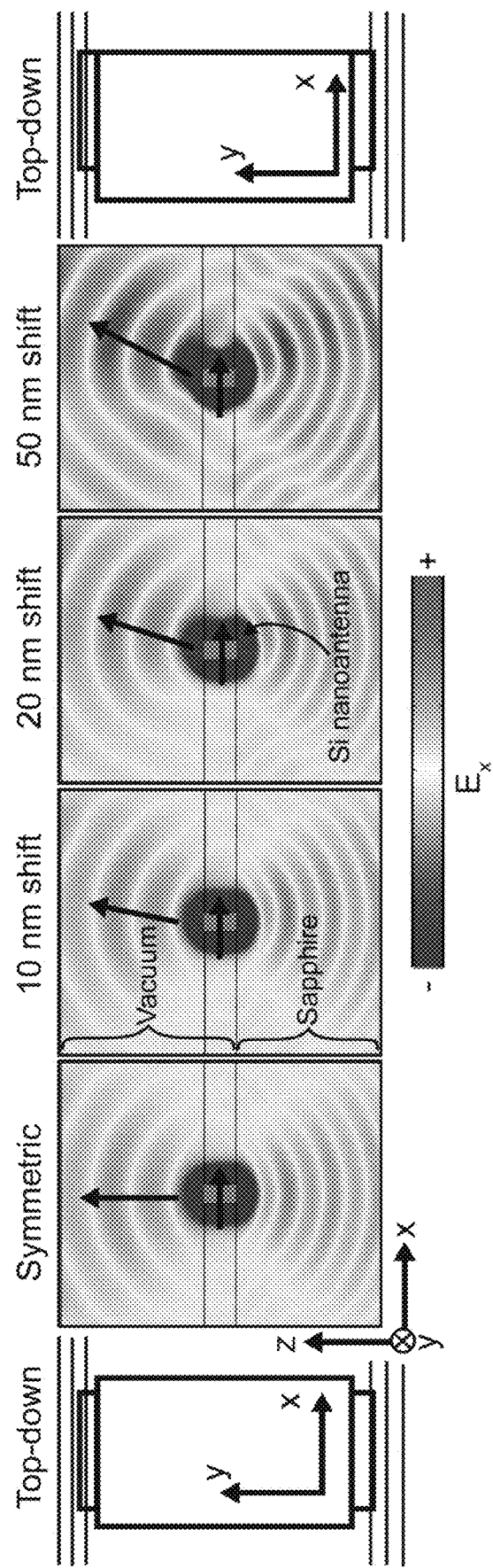
FIG. 8 shows field patterns for an in-plane guided mode resonance for various notch deviations from symmetry.

Having experimentally verified the possibility of embedding high Q resonances within the diffraction spectrum of a linear phase gradient metasurface, we next explore additional opportunities enabled by this design principle. First, we show how the relative weights associated with the available diffraction orders can be independently tailored both on and off resonance. FIG. 2F reveals that high Q scattering into the directly transmitted beam can be increased while the 1st diffracted order is suppressed. The distinct behavior from the diffraction seen in FIGS. 2A-E arises from the particular symmetry of the GMR and its corresponding radiation pattern. For the results of FIGS. 2A-E, the GMR is approximately an in-plane electric dipole (FIG. 8). In contrast, the response in FIG. 2F is associated with a vertically polarized electric dipole, as seen in the bottom field map in FIG. 1C (see also FIG. 9). When compared to an in-plane dipole, a vertical dipole interacts differently with both the incident wave as well as the notch symmetry, giving us a new degree of freedom for molding diffraction. We expect both such behaviors to be useful in switching applications, where very small optical, electrical, or thermal changes to the refractive index can produce large changes in the diffraction efficiency.

Figure 9:
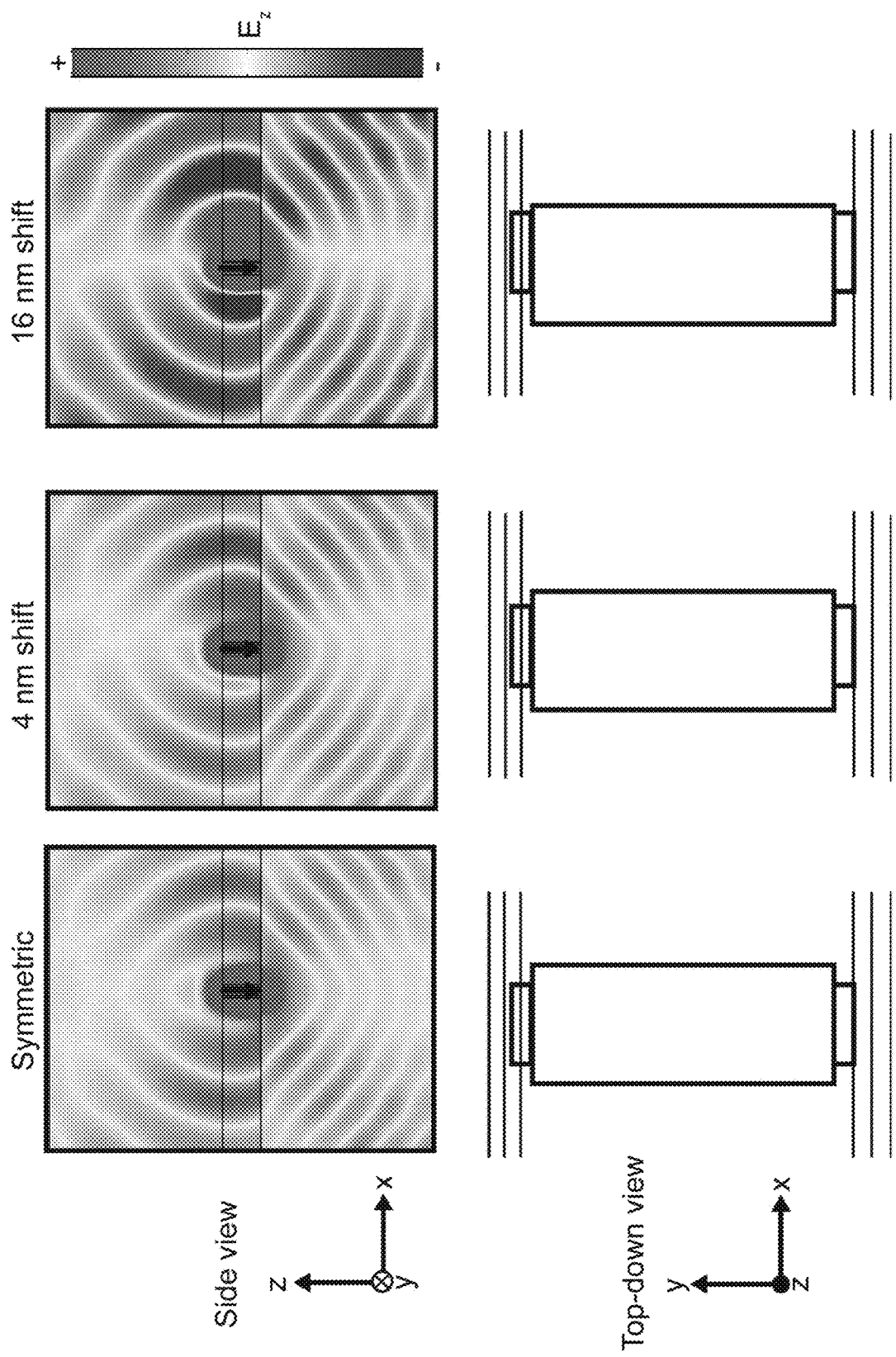
FIG. 9 shows field patterns for a vertically polarized guided mode resonance for various notch deviations from symmetry.

While the radiation pattern of a GMR depends predominantly on the notch dimensions, the overall metasurface scattering is decided by the interplay between the GMR and the background phase profile. In FIGS. 3A-D, we harness this interplay to numerically demonstrate two additional spectral transfer functions of the three-bar design: narrow-band beam-steering, and slow-light beam-steering. To achieve these functions, we switch to a vertically polarized electric dipole GMR. We also decrease the width of the notched bar to 210 nm, thereby changing the background Mie scattered phase associated with the narrow resonance, adjusting its line shape. A key property of a vertical electric dipole is that it radiates symmetrically about the vertical axis. This means such a mode cannot be excited by a plane wave travelling in the vertical direction unless the metasurface breaks that inversion symmetry. In FIG. 9 it is seen that the phase of light emitted to the left and right can be controlled by tuning the relative depth of notches placed on the left and right side of the bar. This allows the interference between the resonant scattering and the background diffraction to be engineered separately for different diffracted directions. In contrast, the in-plane mode, shown in FIG. 8, exhibits very different behavior, with the angular intensity of emission, rather than the angular phase distribution, depending on the notch symmetry.

Figure 3A:
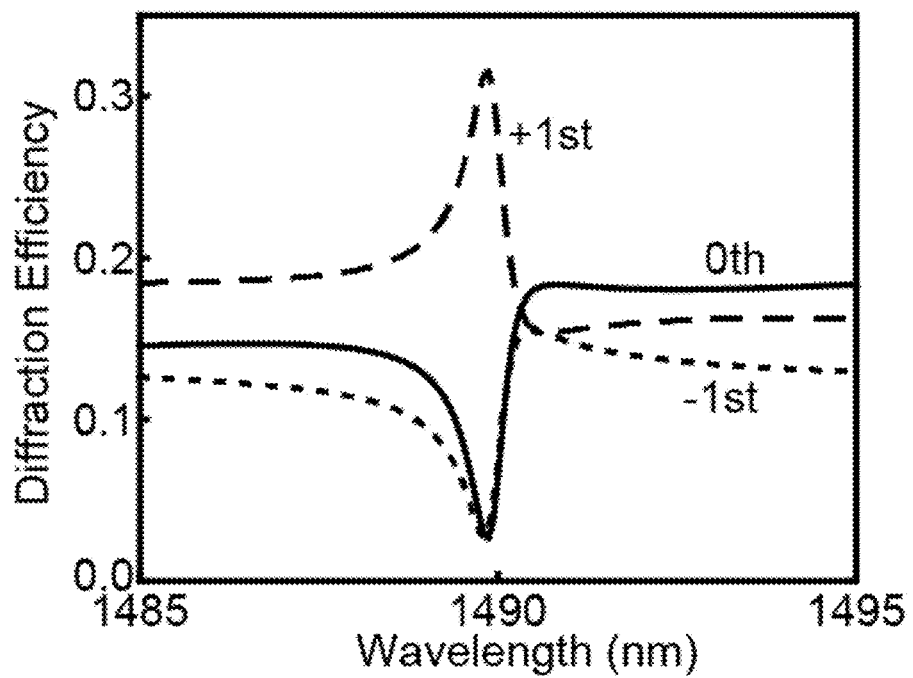
FIGS. 3A-D show an example of narrowband and slow-light beam steering.
Figure 3B:
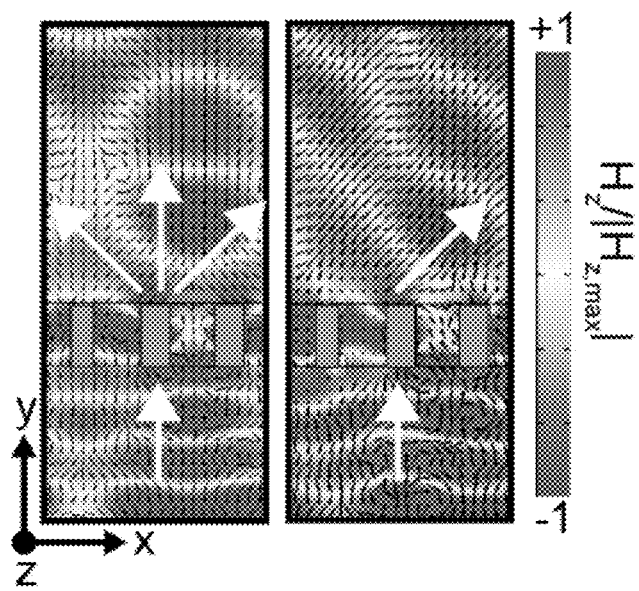
Figure 3C:
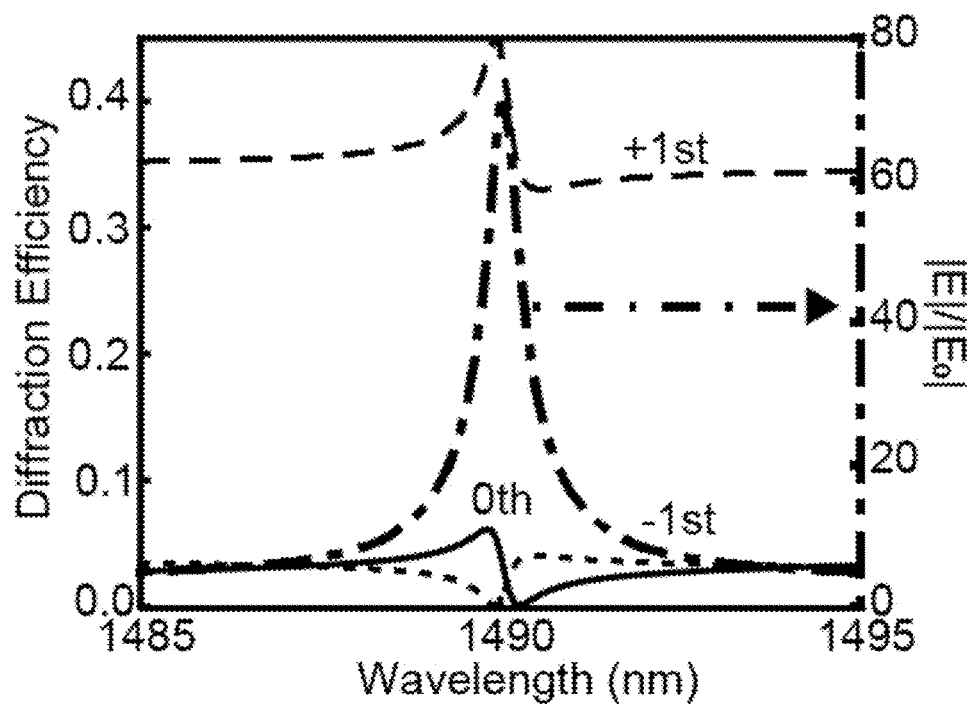
Figure 3D:
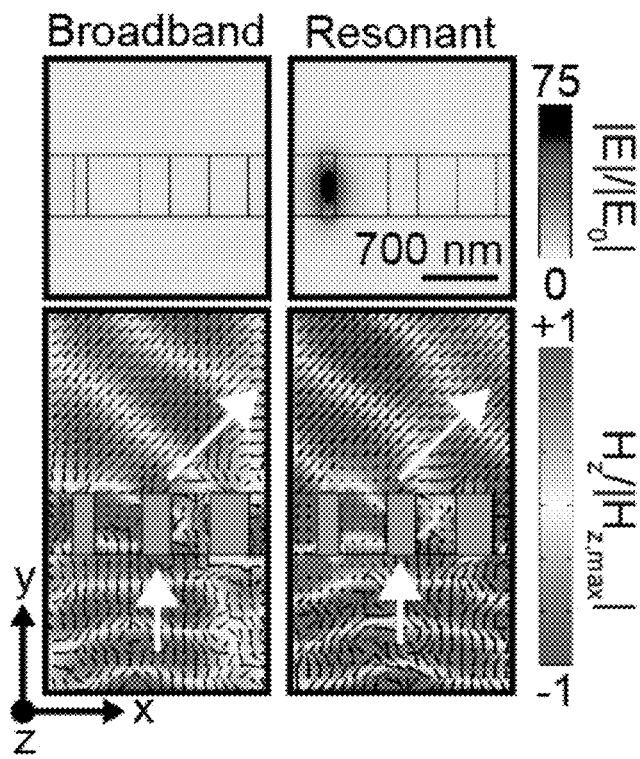

Taking advantage of these insights, we place periodic notches with a 635 nm period into the 210 nm wide bar. The notch dimensions are 36 nm×140 nm on the left and 44 nm×150 nm on the right. We find that placing this structure between bars of widths 275 nm and 280 nm produces sharp dips in both $-1^{st}$ and $0^{th}$ diffraction orders (FIG. 3A, solid and short-dashed curves) but a narrow peak in the $+1^{st}$ diffraction order (FIG. 3A, long-dashed curve). As confirmed by the magnetic field profiles and overlaid Poynting vectors (FIG. 3B), this combination causes the metasurface to exhibit balanced diffraction off-resonance but steer the incident wave to ~45° close to the GMR ($\lambda$=1489.9 nm). In FIG. 3C, we take the structure from FIG. 3A and replace the 275 nm wide bar with a 370 nm wide bar. Here, the spectral variation in the diffraction around the GMR is almost entirely removed while maintaining the strong spectrally narrow field enhancement associated with the high-Q resonance. Similarly, the magnetic field profiles show very little change in the beam steering response with wavelength, while maps of the electric field amplitude reveal a dramatic enhancement (exceeding 75×) within the perturbed bar on resonance (FIG. 3D). Accordingly, with our high-Q metasurface approach, the optical transfer function, near-field intensity, and resonant line shape can all be rationally designed.

B5) High Q Beam Splitting

As a general scheme for realizing high Q phase gradient metasurfaces, structures can easily be designed with wavefront shaping capabilities beyond 45° beam steering. For example, changing the metasurface supercell period while maintaining the linear phase gradient can alter the steering angle. We have demonstrated a suite of samples engineered to steer light to 36°, with similar high-Q responses to those shown in FIGS. 2A-F.

Figure 4A:
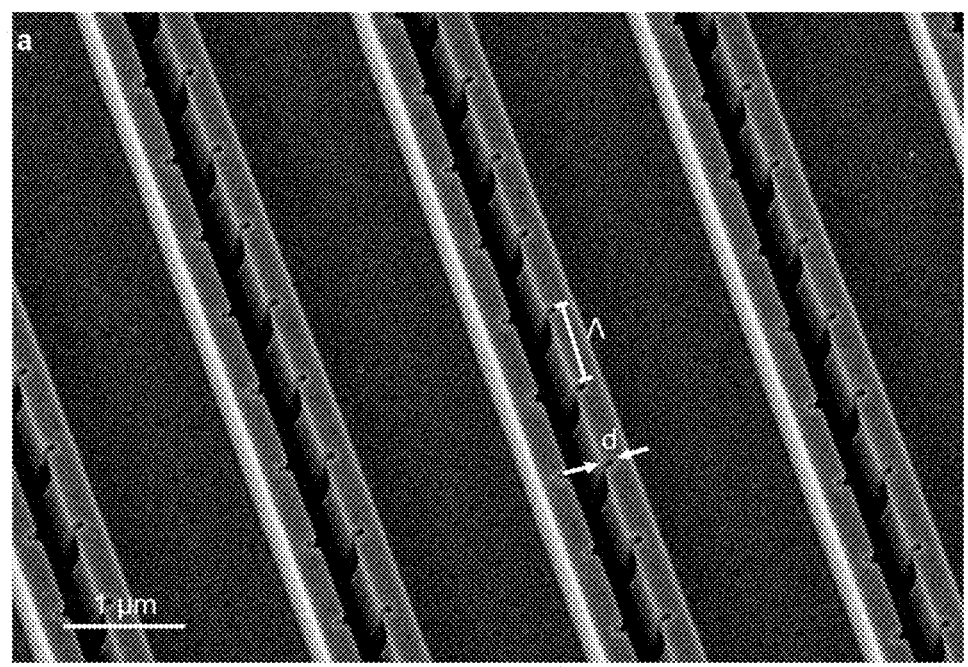
FIGS. 4A-C show an example of a high-Q metasurface beam splitter.
Figure 4B:
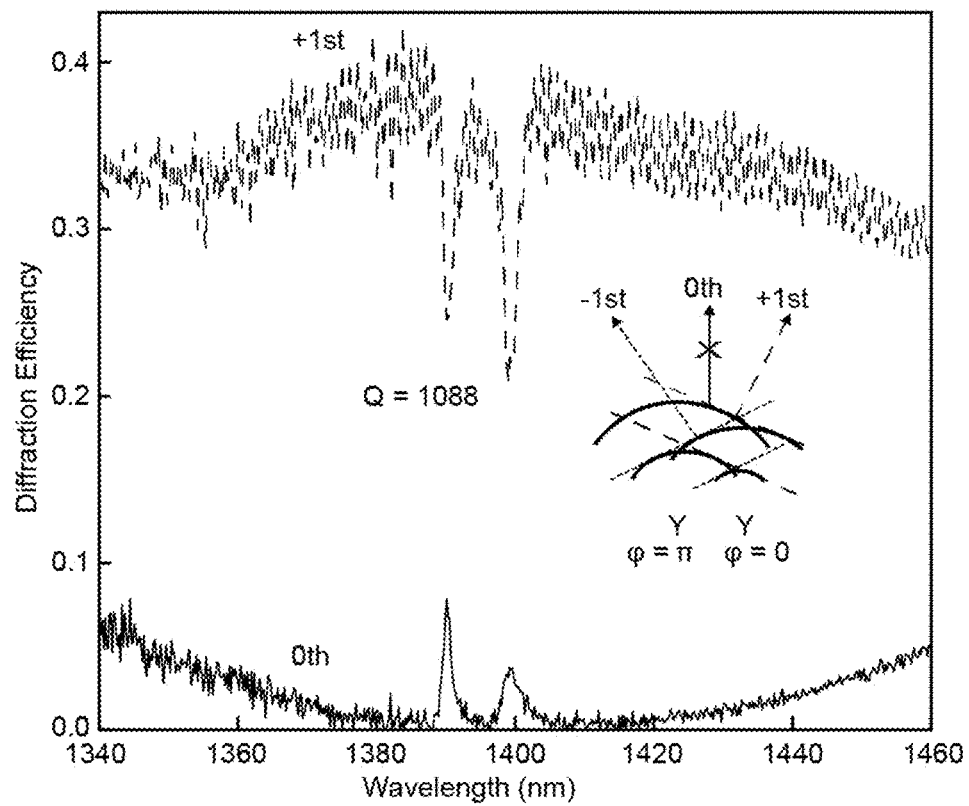
Figure 4C:
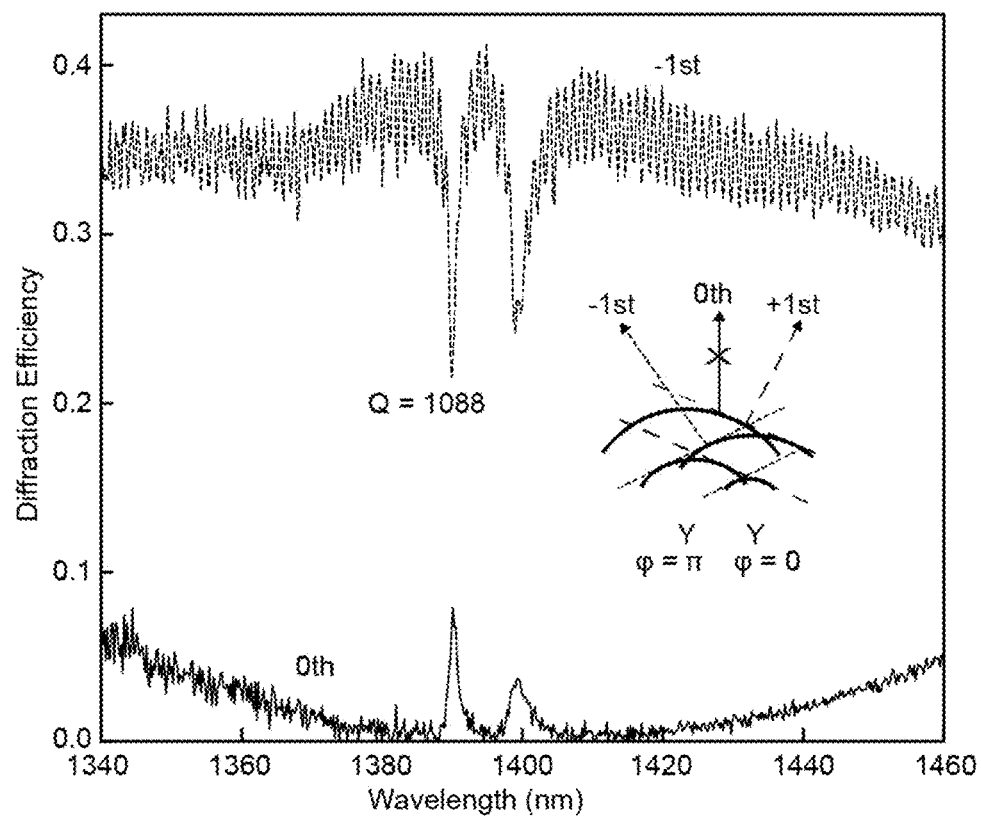

FIGS. 4A-C show experimental demonstration of free space high-Q metasurface beam-splitting. In this case, light incident on the metasurface is re-directed in approximately equal magnitude to the +1 and -1 diffraction orders, while cancelling the 0th order transmission almost entirely. An angle-view SEM image of one such fabricated structure is shown in FIG. 4A. The metasurface has the same phase gradient period of 2121 nm as the 45° beamsteering samples and is composed of two phase pixels. One pixel is a nanoantenna made from two coupled 240 nm wide silicon nano-bars. Light leaking through the bare substrate between these nanoantennas acts as the second pixel. Measured spectra from a beam splitting metasurface, shown in FIGS. 4B-C, reveal balanced diffraction in +1st (long-dashed curve) and -1st (short-dashed curve) directions, while the 0th order transmission (black curve) is almost entirely suppressed at the center wavelength of 1400 nm. A schematic representation of the working principle underlying the beam splitting is shown in the insets of FIGS. 4B-C. With neighboring pixels differing in their phase delay by H, destructive interference occurs in the forward direction while constructive interference occurs for waves deflected to ~±41°.

Unlike the other beam steering devices, the guided modes of the metasurface pictured in FIG. 4A are not localized within a single nano-bar. Instead, coupling between the bars generates a collection of even and odd waveguide modes (FIG. 10). Following our previous prescription, we pattern the inside edge of each element with 80 nm long perturbations of period $\lambda$=690 nm and depth d (in the case of FIG. 4A, d=100 nm to best visualize the structure; in FIGS. 4B-C the notch depth is 30 nm). Two sharp GMRs appear in the diffraction spectra of FIGS. 4B-C at wavelengths 1389 nm and 1398 nm with Qs of 1088 and 580, respectively. Here, the beam-splitting efficiency is reduced while the direct transmission is resonantly increased. Varying the perturbation depth, as before, modifies the quality factor. Note that although four guided modes exist with this period in this spectral range, by maintaining inversion symmetry in the diffraction plane only the two antisymmetric GMRs can be excited with the polarization we use for illumination.

B6) Conclusions

While nanoantennas represent an exciting development for optical science, researchers typically face a trade-off between antenna size in relation to wavelength and resonant lifetime. In shaping diffraction using high Q nanoantennas with subwavelength cross sections in the diffraction plane, we provide experimental evidence to suggest this trade-off may not, in fact, be fundamental. These results point to the possibility that highly resonant highly compact features, once only in the purview of on-chip photonics, can be rationally designed to coincide with an arbitrarily chosen electromagnetic wavefront. Our proof of principle phase gradient metasurfaces, namely beam steerers and beam splitters, can lead to a host of high Q diffractive flat optics including lenses and holograms. We also demonstrated that diffraction order dependent GMR dispersion can be controlled via the perturbation symmetry and multiplexing can be achieved using coupled elements. The phenomenon we present is not exclusive to nano-bars of varying widths. We expect to find similar behavior in other design strategies, including isotropic structures and those based on geometric phase. The present study has focused on devices that maintain periodicity along one dimension and thus require sufficient spatial extent in that direction to sustain long resonant lifetimes. This, however, is not an essential requirement. By both reducing the group velocity dispersion of the guided modes with high contrast index variations and using photonic crystal mirrors to reflect light that would otherwise leak through the ends of the nanoantennas, the scale of our metasurfaces can be reduced significantly. We note that our highest measured Q~2500 is limited mainly by scattering losses. Much higher Q factors, i.e. $10^4$-$10^5$, should be achievable with refined fabrication processes and improved imperfection-tolerant designs. By enabling resonant near-field intensity and lineshape to be engineered in conjunction with arbitrary wavefront transformations, we envision high Q phase gradient metasurfaces impacting any discipline that benefits from efficient diffractive optical switching or tuning and low nonlinear thresholds. Applications include LIDAR, LiFi and ultrathin nonreciprocal, classical, and quantum light generation.

B7) Methods

Design: Samples dimensions were designed using COMSOL Multiphysics to model the waveguide dispersion, as well as the phase response. The phase response was designed using periodic boundary conditions with a silicon bar of a given dimension to determine the phase response for each meta-element.

Fabrication: The metasurfaces were fabricated using standard lithographic procedures. First, 600 nm single crystal silicon on Sapphire (MTI Corp) substrates were cleaned by sonication in Acetone and Isopropyl Alcohol. Following a dehydration bake, hsq negative tone resist (XR-1541-06, Corning) was spin-coated to the sample and baked for 45 minutes at 90 C. To reduce charging, a charge dissipation layer was applied (e-spacer, Showa Denko) and the sample was baked again. The patterns were written using electron-beam lithography (Jeol 6300-FS), and developed in strong base. Following lithography, the pattern was transferred to the silicon layer using reactive ion etching. First, a nonselective etch was performed to break through the native oxide, while the main etch step utilizes $Cl_2$, HBr, and $O_2$ (Lam TCP 9400), etching anisotropically and stopping on the sapphire substrate. The resist was stripped using 2% hydrofluoric acid in water, following an organic clean using a Piranha solution heated to 120 C.

Characterization: Representative images were taken with an FEI Magellan 400 XHR Scanning Electron Microscope (SEM) with FEG source or FEI Helios 600i dual beam SEM/FIB. For top-down images, a conductive polymer (ESPACER) was applied to reduce charging in the images. For side and tilted views, a representative sample was coated with a ~3.5 nm film of Gold/Palladium (Au:Pd) to reduce charging. Images were typically with accelerating voltages between 2 kV and 5 kV.

Optical Characterization: spectroscopic measurements were made using a home-built angle-resolved microscope. A collimated broadband laser (NKT supercontinuum) is polarized and weakly focused onto the metasurface at normal incidence. Illumination is perpendicular to the metasurface on an assembly that can set a vertical incident angle relative to the objective. Inserting a Bertrand lens on a flip mount focused on the back focal plane of the objective allows us to project the Fourier plane onto a camera. Because the metasurface diffracts in one plane, we use a grating to split out the spectral response in the other dimension; hence, we simultaneously obtain the energy and momentum of the transmitted light. Light is collected with a 0.42 NA objective (collection half-angle of 24°). To capture all 3 diffraction orders, we perform two measurements with the sample/illumination angle set to ±20° relative to the objective. One measurement contains the $0^{th}$ and $+1^{st}$ diffraction orders while the other contains the $0^{th}$ and $-1^{st}$ diffraction orders. The two spectral maps are aligned, and the overlapping data is removed in FIG. 2A.

Throughout this work the resonant spectral features have been analyzed by fitting the intensity data with the function, $$I = \left| \frac{1}{1 + F\sin^2(n_s k h_s)} \right| \left\| a_r + a_i i + \frac{b}{f - f_0 + \gamma i} \right\|^2 \quad (1)$$

The second multiplicative term represents the superposition between a constant complex background, $a_r + a_i i$, and a Lorentzian resonance with resonant frequency $f_0$ and full-width at half-maximum $2\gamma$. The Q factor of this resonance is then taken to be $Q = f_0/2\gamma$. The first term accounts for the Fabry-Perot interference through the substrate of thickness $h_s$ and refractive index $n_s$. k is the free-space wavevector $(2/\pi/\lambda)$ and F accounts for the reflectivity of the air/substrate interfaces.

B8) Supplemental Information

Figures 5A, 5B, 5C:
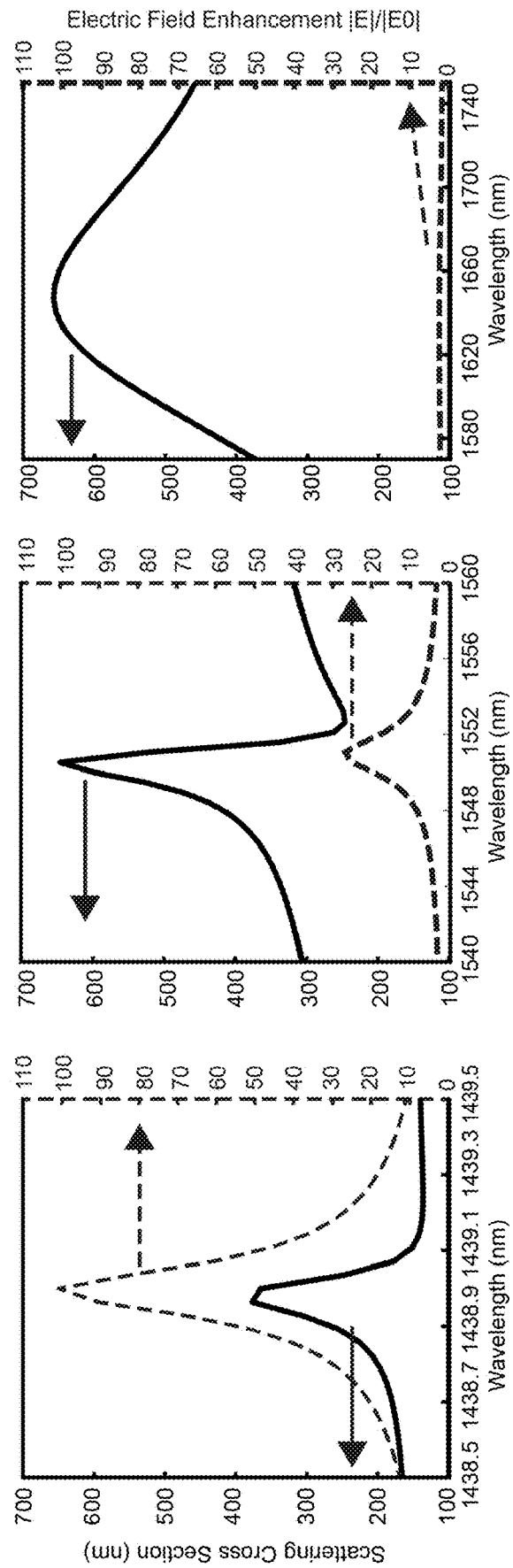
FIGS. 5A-C show guided mode resonances in an isolated nanobar.

FIGS. 5A-C show guided mode resonance in an isolated nanobar. Simulated scattering cross section (solid lines, left axis) and resonant field enhancement (dashed curves, right axis) for isolated periodically perturbed nanoantenna with dimensions matching the largest element in FIG. 1D above. All axes are equally scaled for direct comparison. FIGS. 5A-B reveal that even in an isolated nanoantenna the subtle periodic perturbation can generate high Q guided mode resonances. FIG. 5C shows the low Q Mie resonance originating from the cross-sectional dimensions of the bar. While the three modes exhibit drastically different field amplifications, their peak scattering cross sections are roughly the same, which justifies treating Mie and guided mode resonances on the same footing when analyzing the far field response of our metasurfaces.

FIGS. 6A-B show that scaling down metasurface dimensions does not impact high-Q resonances. FIG. 6A is an SEM image of a fabricated 10 bar device, with lateral dimension approximately 7 μm. FIG. 6B shows spectra of diffraction into +1st and −1st diffraction orders, showing a high-Q resonance. Using identical illumination conditions as described above, we are unable to report the 0th order due to the beam spot (~200 μm) being much larger than the finite size along the phase gradient direction.

FIG. 7 shows simulated guided mode dispersion in a periodically perturbed nanoantenna as a function of perturbation depth. The notched bar geometry here corresponds to the notched bar in FIG. 1F and FIGS. 2A-E.

FIG. 8 shows eigenmode emission patterns for in-plane polarized electric dipole GMR as a function of notch symmetry for the largest bar in our beamsteering metasurfaces. The narrowed region formed by the notch is being shifted increasingly to the right. The structural shift directs the emission intensity slightly towards the right.

FIG. 9 shows eigenmode emission patterns for vertically polarized electric dipole GMR as a function of notch symmetry in the thinnest bar in FIGS. 3A-D above. As shown via the top down images to the left of each simulation, the narrowed region formed by the notch is being shifted to the right by 4 nm (center) and 16 nm (right). The structural shift causes a phase delay for the wave emitted to the right compared to the left. The bar geometry of the middle plot (4 nm shift) is used in FIGS. 3A-D above.

Figure 10A:
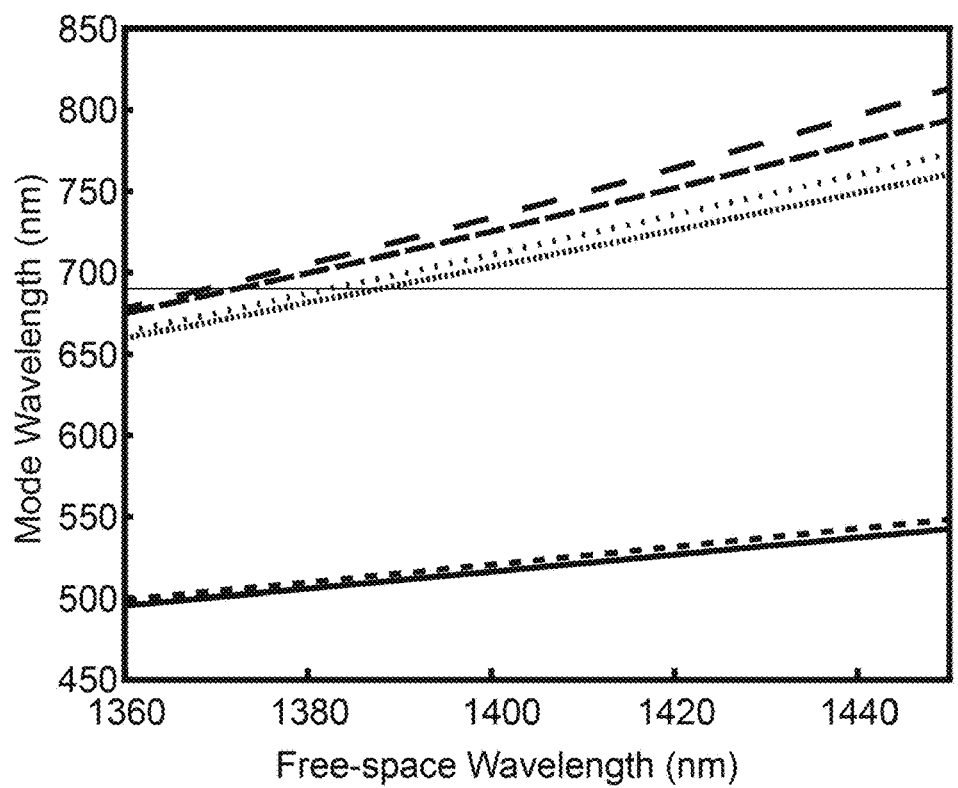
FIGS. 10A-B show guided modes of the beam splitting metasurface of FIGS. 4A-C.
Figure 10B:
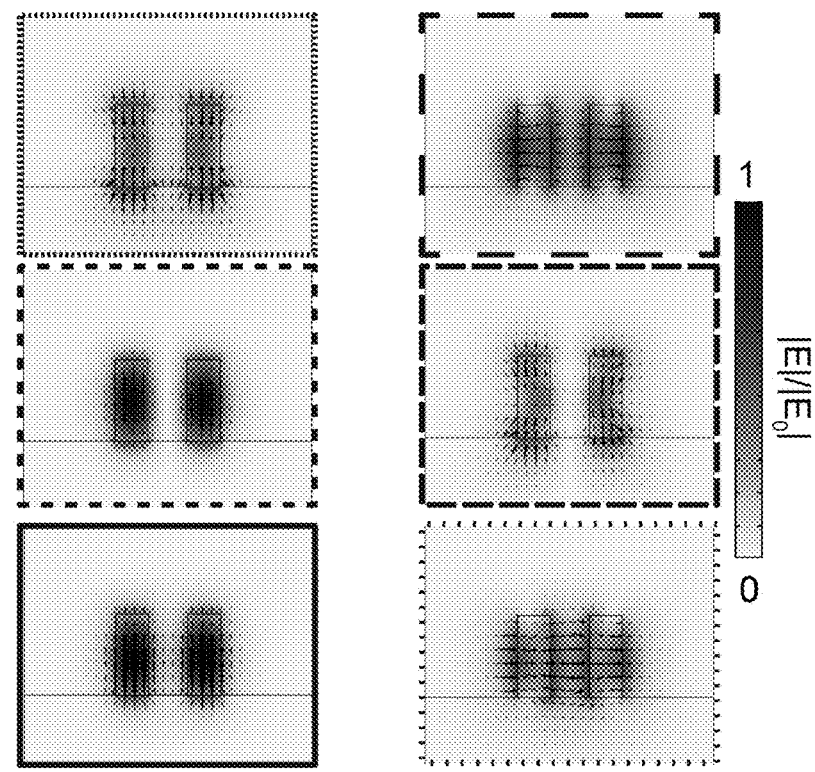

FIGS. 10A-B show guided modes of the beam splitting metasurface. The curves on FIG. 10A have line styles coded to match the mode profiles shown on FIG. 10B. The thin horizontal line represents the notch period used in FIGS. 4A-C above.

The invention claimed is:

1. An apparatus comprising:
   an electromagnetic metasurface having metasurface features disposed conformally on a surface of a substrate, wherein adjacent metasurface features of the electromagnetic metasurface are spaced apart by less than an operating wavelength of the apparatus;
   wherein the metasurface features of the electromagnetic metasurface support one or more in-plane guided mode resonances; and
   a pattern of coupling features superposed on the metasurface features and configured to couple free-space radiation to a selected at least one of the in-plane guide mode resonances.

2. The apparatus of claim 1, wherein the metasurface features include one or more waveguides, and wherein the guided mode resonances correspond to waveguide modes of at least one of the waveguides.

3. The apparatus of claim 2, wherein the coupling features include a periodic longitudinal perturbation of the at least one of the waveguides.

4. The apparatus of claim 2, wherein the at least one of the waveguides is a photonic crystal waveguide.

5. The apparatus of claim 1, wherein a quality factor Q of the selected at least one of the in-plane guided mode resonances is 100 or more.

6. The apparatus of claim 1, wherein the metasurface features have at least one sub-wavelength dimension.

7. The apparatus of claim 1, wherein the electromagnetic metasurface is a phase gradient metasurface.

8. The apparatus of claim 1, wherein the electromagnetic metasurface is configured as a beam steering device.

9. The apparatus of claim 1, wherein the electromagnetic metasurface is configured as a beam splitting device.

10. The apparatus of claim 1, wherein the electromagnetic metasurface is configured as a beam focusing or defocusing device.

11. The apparatus of claim 1, wherein a material of the metasurface features is selected from the group consisting of: silicon, lithium niobate, gallium phosphide, gallium arsenide, aluminum nitride, indium phosphide, III-V semiconductors, and diamond.

12. The apparatus of claim 1, wherein the surface of the substrate is planar.

13. The apparatus of claim 1, wherein the surface of the substrate is curved.

* * * * *